United States Patent [19]

Lin

[11] Patent Number: 5,598,231
[45] Date of Patent: Jan. 28, 1997

[54] GLASSES CAPABLE OF PRODUCING A THREE-D VISUAL EFFECT

[75] Inventor: Ming-Yen Lin, Taipei, Taiwan

[73] Assignee: Artificial Parallax Electronics Corp., Taipei, Taiwan

[21] Appl. No.: 567,089

[22] Filed: Dec. 4, 1995

[51] Int. Cl.⁶ .............................. G02C 7/12; G02C 1/00; G02F 1/1335
[52] U.S. Cl. ............................. 351/49; 351/41; 351/158; 349/96
[58] Field of Search ................................. 351/49, 41, 44, 351/85, 86, 158; 359/465, 464, 63, 83, 40, 41; 348/51, 52, 53, 57

[56] References Cited

U.S. PATENT DOCUMENTS 4,508,526  4/1985  Dutcher ..................................... 351/49
4,968,127  11/1990  Russell et al. ............................. 351/49

Primary Examiner—Hung Xuan Dang
Attorney, Agent, or Firm—W. Wayne Liauh

[57] ABSTRACT

It is a pair of glasses capable of producing a 3-D visual effect, mainly including a frame, two polarizing lenses set in the frame, and two additional lanminated lenses removably disposed either in front of or behind the two polarizing lenses. The laminated lenses each consists of two glass sheet layers, an LCD layer between the two glass sheet layers, and a polarizer layer attached to an outer side of one of the two glass sheet layers. When a voltage is applied to the LCD layer, molecules constituting the LCD layer rotate and change their arrangement directions to produce light blocking effect, enabling the glasses to be used as an LCD shutter glass for watching a 3-D image system. When the additional laminated lenses are removed, the glasses can be used as a normal sun glass.

2 Claims, 5 Drawing Sheets

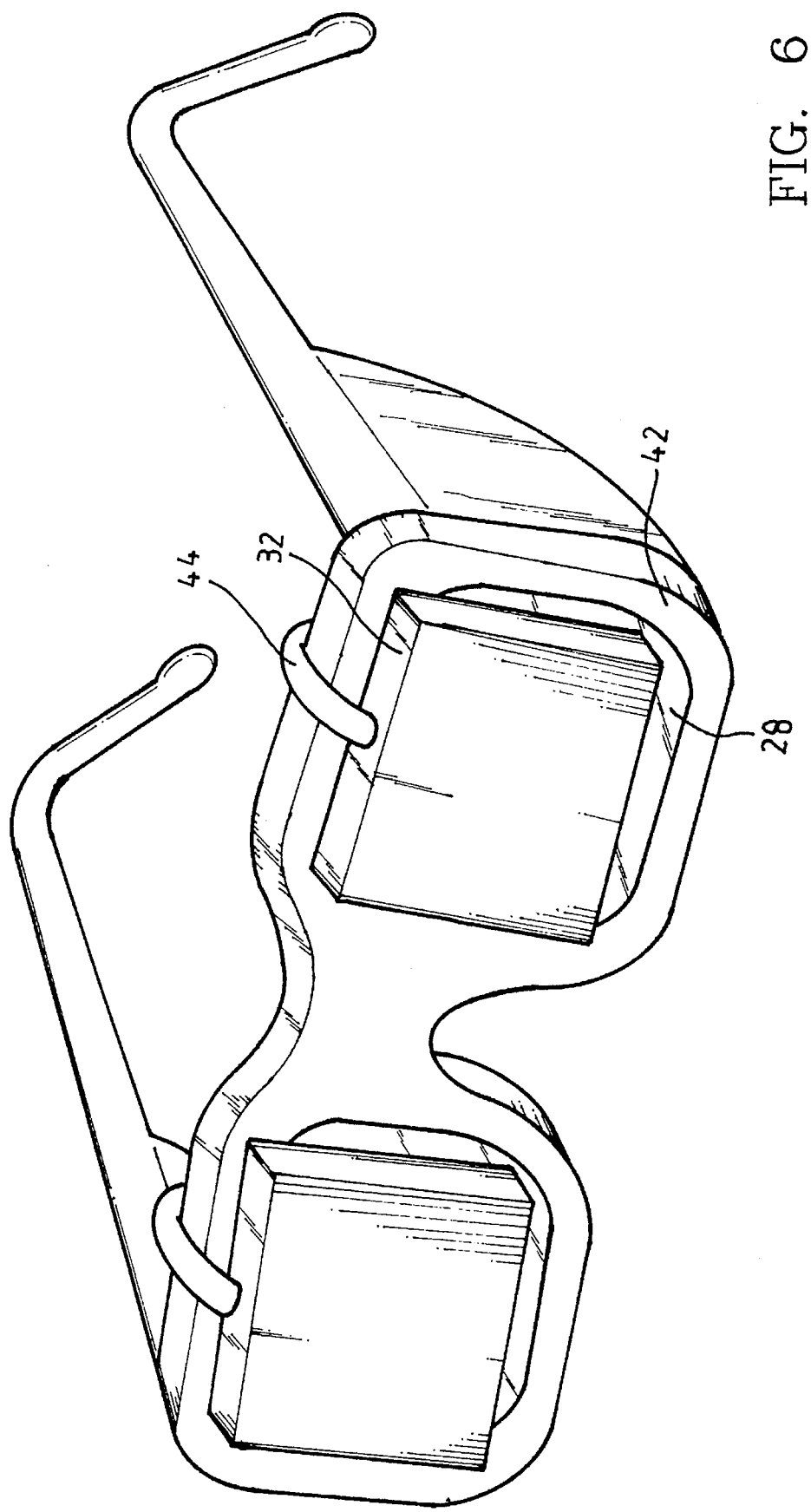

5,598,231

GLASSES CAPABLE OF PRODUCING A THREE-D VISUAL EFFECT

BACKGROUND OF THE INVENTION

1. Field of the Invention

The present invention relates to an improved type of glasses, and more particularly to an improved type of glasses capable of producing a three-D visual effect. The glasses mainly include lenses made of polarizing sheets and removable laminated lenses disposed in front of or behind the polarizing lenses. The combination of the polarizing lenses and the removable laminated lenses enables the glasses to produce a three-D visual effect to watch different Three-D systems.

2. Description of the Prior Art

With the nowaday state-of-the-art technology, the application of multi-media 3-D image systems has become a simple thing. However, on the other hand, the so-called LCD shutter glasses used to watch such advanced 3-D image systems still have the same flat and clumsy appearance which is, of course, inconvenient and uncomfortable in use.

FIG. 1 illustrates a pair of conventional LCD shutter glasses 16 for producing a three-D visual effect, which mainly includes a frame 18, two fixing members 10, and two lenses 14 fixed between the frame 18 and the fixing members 10 by means of screws 12. As shown in FIG. 1, the fixing member 10 each has a profile corresponding to that of the frame 18. Please refer to FIG. 2, the lens 14 each consists of two polarizer layers 19, 26, two glass sheet layers 20, 24 sandwiched between the polarizer layers 19, 26, and an LCD layer 22 sandwiched between the two glass sheet layers 20, 24.

The drawbacks of the above-described conventional LCD shutter glass include: 1) the polarizing lenses must be fixedly mounted in the frame by attaching the fixing members to a backside of the frame with screws, giving the whole glasses a clumsy and uncomfortable feeling; 2) the fixing members are fixed to the frame by means of screws, it is therefore time-consuming to assemble and/or disassemble the fixing members to and/or from the frame; 3) the glasses must have the same square profile without any change for the lenses and the fixing members to fixedly mount on the frame; and 4) the glasses have only limited value, that is, they can be used to watch 3-D systems only and are useless in other daily activities. Such value-limited LCD shutter glasses have only one single function and therefore can not satisfy the need of modern life at all.

SUMMARY OF THE INVENTION

It is therefore a primary object of the present invention to provide a pair of glasses capable of producing a 3-D visual effect which include two polarizing lenses and two removable laminated lenses either disposed in front of or behind the polarizing lenses. Through the combination of the polarizing and the removable laminated lenses as well as the application of optical and electrical techniques, this pair of glasses can be use as an LCD shutter glass to watch a 3-D image systems. The glasses of the present invention do not need any fixing member to fix the polarizing lenses and are no longer clumsy and uncomfortable in use but may have changeful appearances to satisfy diversified individual preferences.

Another object of the present invention is to provide a pair of glasses capable of producing a 3-D visual effect which include two polarizing lenses and two removable laminated lenses either disposed in front of or behind the polarizing lenses, so that the glasses can be used not only as an LCD shutter glass in watching 3-D image systems, but also as a sun glass and/or a polarizing glass. When the polarizing lenses and the removable laminated lenses are combined, the glasses can be used as an LCD shutter glass to watch a 3-D. And, when the removable laminated lenses are removed, the glasses can be used either as a sun glass or as a polarizer for watching a polarizing type of 3-D. That is, the glasses of the present invention are multi-functional glasses and have simplified structure and changeful appearances to meet the requirement of nowaday competitive market.

BRIEF DESCRIPTION OF THE DRAWINGS

FIG. 6 is a perspective showing another embodiment of the present invention.

DETAILED DESCRIPTION OF THE PREFERRED EMBODIMENTS

Figure 4:
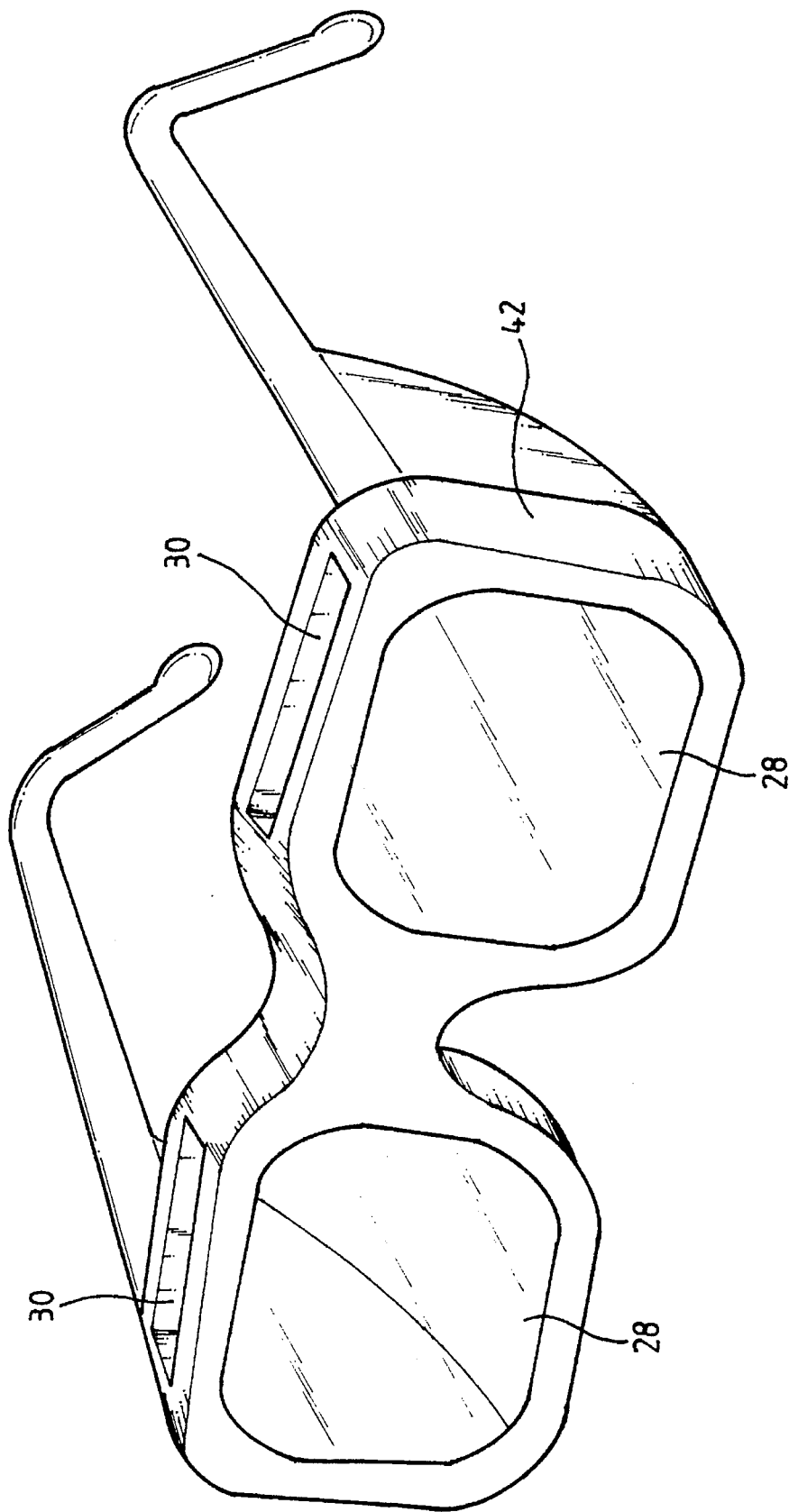
FIG. 4 is a perspective showing the pair of glasses of the present invention.
Figure 5:
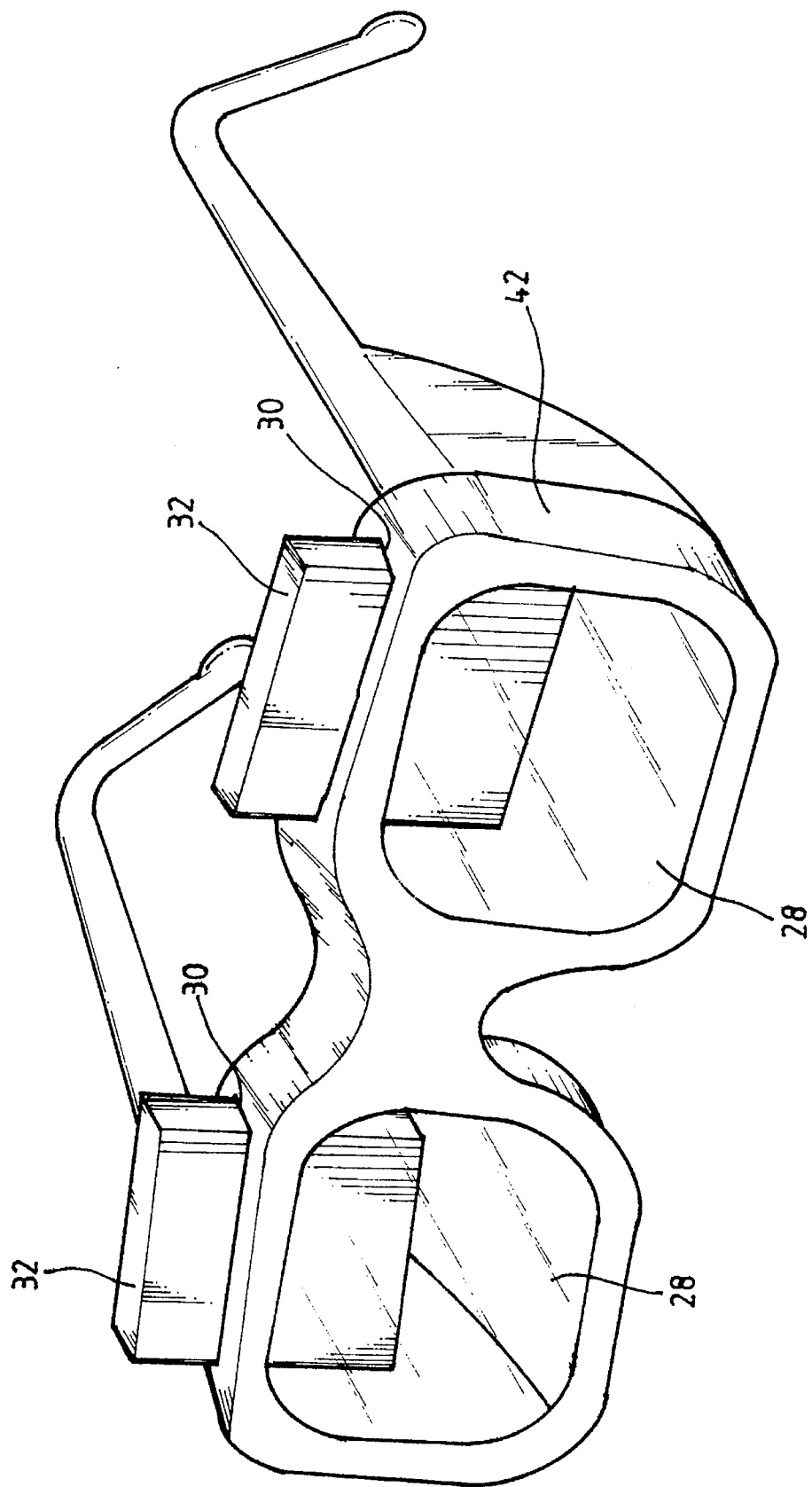
FIG. 5 is a perspective of the present invention showing the manner in which the removable laminated lenses are disposed into and/or removed from the glasses.

Please refer to FIG. 4 which is a perspective showing a first embodiment of the glasses of the present invention. The glasses include a frame 42 and a pair of lenses 28 made of polarizers. Polarizing angles respectively caused by the two polarizing lenses 28 are normal to each other, thus, the glasses of the present invention can be used either as a sun glass in normal condition or as a polarizing glass to produce a 3-D visual effect. Two elongated narrow slots 30 are formed on a top of the frame 42 directly above the two lenses 28 for removably receiving two additional laminated lenses 32 therein, as shown in FIG. 5. With these two slots 30, no other fixing member is required behind the frame to fix the lenses of the glasses.

Figure 1:
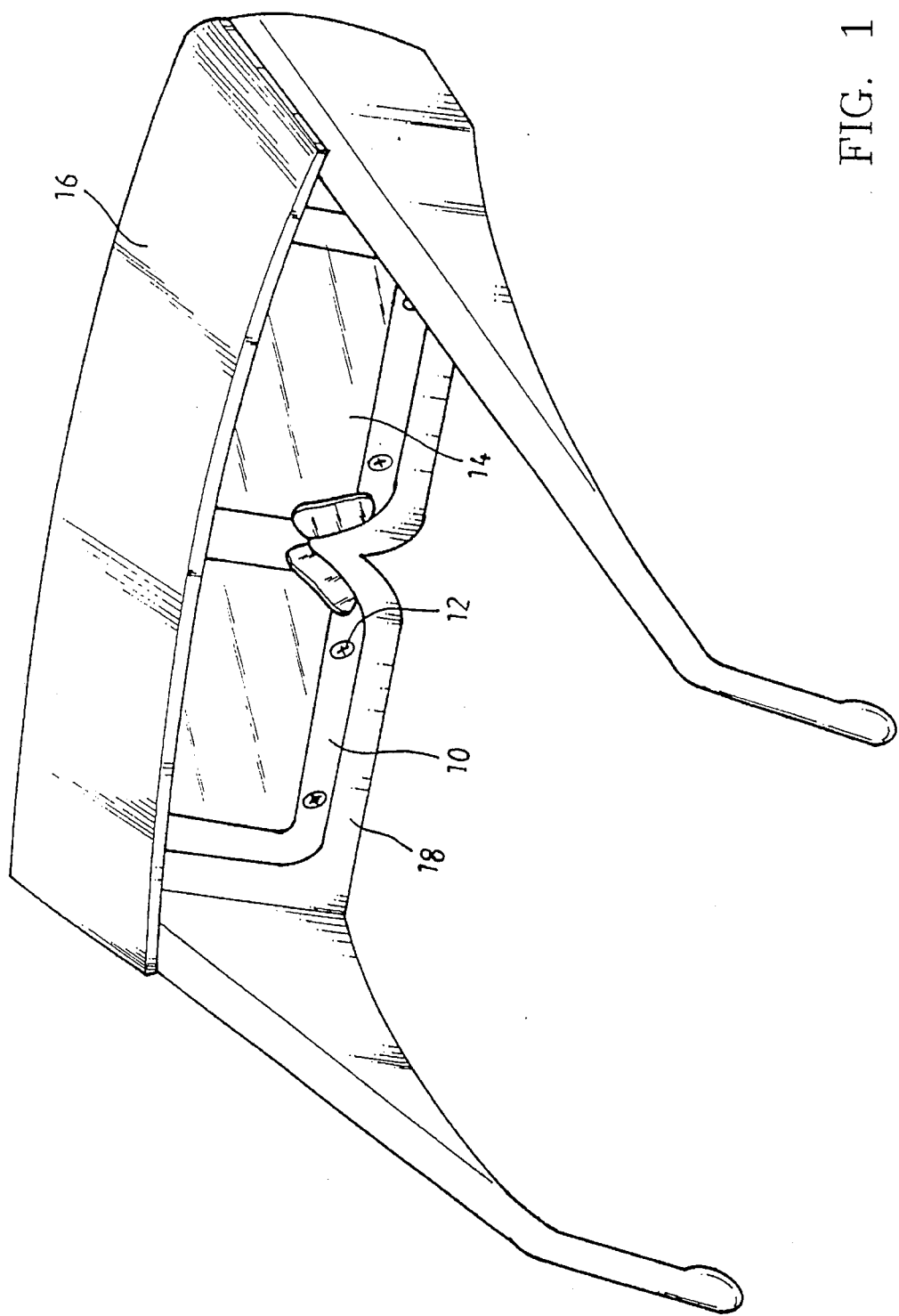
FIG. 1 illustrates a conventional LCD shutter glass capable of producing a 3-D visual effect.
Figure 3:
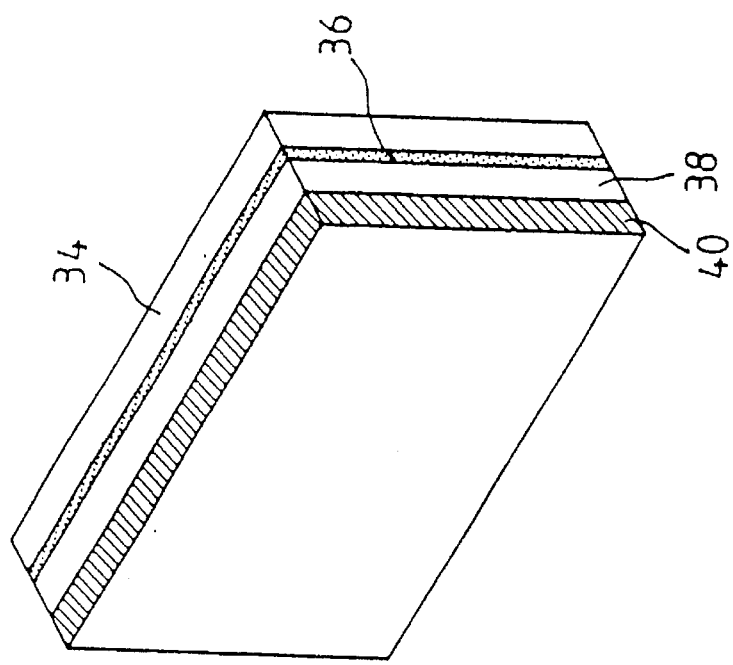
FIG. 3 is a perspective showing the structure of the laminated lens for the glasses of the present invention.
Figure 2:
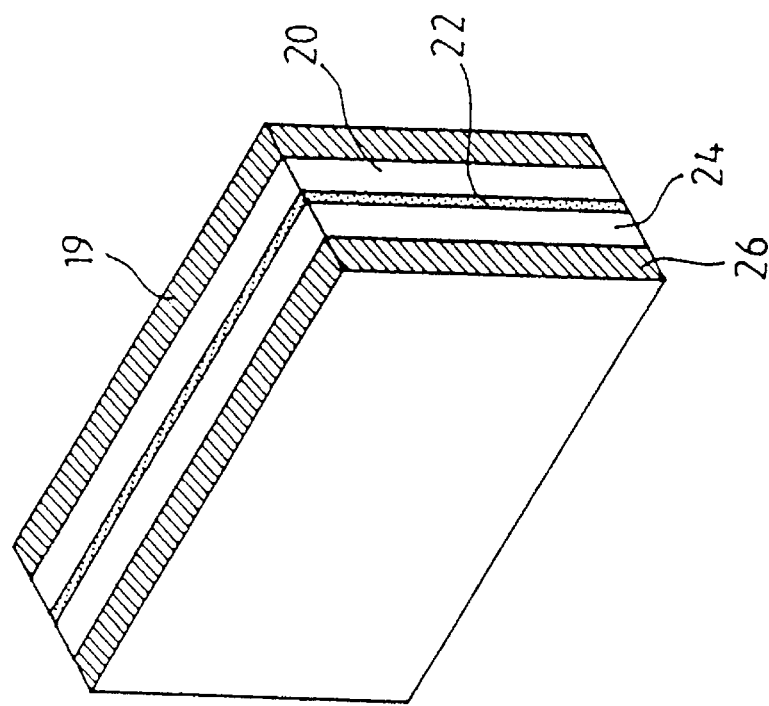
FIG. 2 is a perspective showing the structure of a lens for the conventional LCD shutter glass to produce a 3-D visual effect.

Please refer to FIG. 3. The lens 32 each consists of two glass sheet layers 34, 38, a polarizer layer 40 laminated to an outer surface of one of the two glass sheet layers (it is glass sheet layer 38 in the embodiment shown in FIG. 3) and an LCD layer 36 disposed between the two glass sheet layers 34, 38. The additional laminated lens 32 each is positioned in the slot 30 with the glass sheet layer 34 facing the polarizing lens 28 and the polarizer layer 40 facing the eye of a wearer. When the glasses are to be used as an LCD shutter glass for watching a 3-D image system, the additional laminated lenses 32 are inserted into the two slots 30 to engage with the frame 42 and to function together with their respective corresponding polarizing lens 28 to produce a 3-D visual effect, just like the lens shown in FIG. 2. When a voltage is applied to the LCD layer 36 of the lenses 32, molecules constituting the liquid crystal layer are caused to rotate to change their arrangement direction, producing an effect of blocking light, that is, functioning like a shutter.

Please refer to FIG. 6 in which another embodiment of the present invention is shown. The glasses include a frame 42 and a pair of lenses 28 made of polarizers. Again, the polarizing angles caused by the two lenses 28 are normal to each other. Two additional laminated lenses 32 are also removably provided in front of the polarizers 28 by means of two lens holders 44. The lens 32 each also consists of two glass sheet layers 34, 38, a polarizer layer 40 laminated to an outer surface of one of the two glass sheet layers (in this case, the glass sheet 38), and an LCD layer 36, as shown in FIG. 3. The additional laminated lenses 32 are disposed in front of their respective corresponding polarizing lenses 28 with the polarizer layers 40 facing outward and the glass sheet layers 34 facing the eyes of the wearer. When the glasses are to be used as an LCD shutter to watch a 3-D image system, use the lens holders 44 to firmly hold the additional laminated lenses 32 in front of the polarizing lenses 28. When a voltage is applied to the LCD layers 36 of the lenses 32, the molecules constituting the liquid crystal layers are caused to rotate to change their arrangement direction, producing an effect of blocking light, that is, functioning like a shutter.

When the lenses 32 are removed either from a front side of the polarizing lenses 28 as shown in FIG. 6, or from a back side of the polarizing lenses 28 as shown in FIG. 5. the glasses function just like a normal sun glass and can be worn in daily activities.

What is claimed is:

1. A pair of glasses capable of producing a three-D visual effect, comprising a frame, two polarizing lenses set in said frame, and two additional laminated lenses removably attached to said frame to be located behind said two polarizing lenses; said two polarizing lenses producing two polarizing angles which are normal to each other; and said laminated lenses each consisting of two glass sheet layers, an LCD layer disposed between said two glass sheet layers, and a polarizer layer laminated to an outer surface of one of said glass sheet layers; whereby when a voltage is applied to said LCD layer, molecules constituting said LCD layer rotate and change their arrangement direction to achieve the effect of blocking light, thereby enabling said pair of glasses to produce a 3-D visual effect.

2. A pair of eyeglasses capable of producing a three-D visual effect, comprising a frame, two polarizing lenses set in said frame, and two additional laminated lenses removably attached to said frame to be located in front of said two polarizing lenses; said two polarizing lenses producing two polarizing angles which are normal to each other; and said laminated lenses each consisting of two glass sheet layers, an LCD layer disposed between said two glass sheet layers, and a polarizer layer laminated to an outer surface of one of said glass sheet layers; whereby when a voltage is applied to said LCD layer, molecules constituting said LCD layer rotate and change their arrangement direction to achieve the effect of blocking light, enabling said pair of glasses to produce a 3-D visual effect.

* * * * *